UNITED STATES PATENT OFFICE.

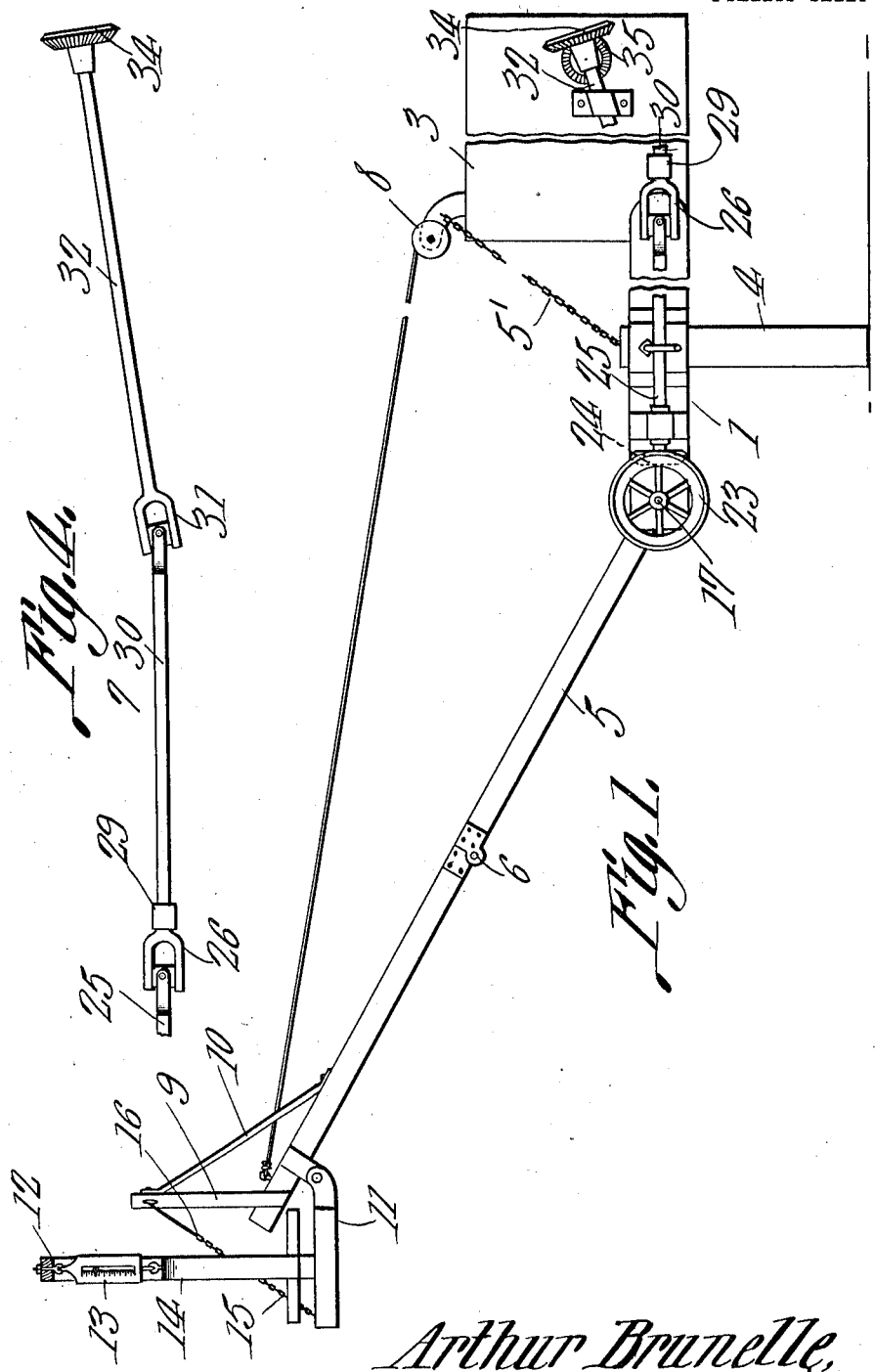

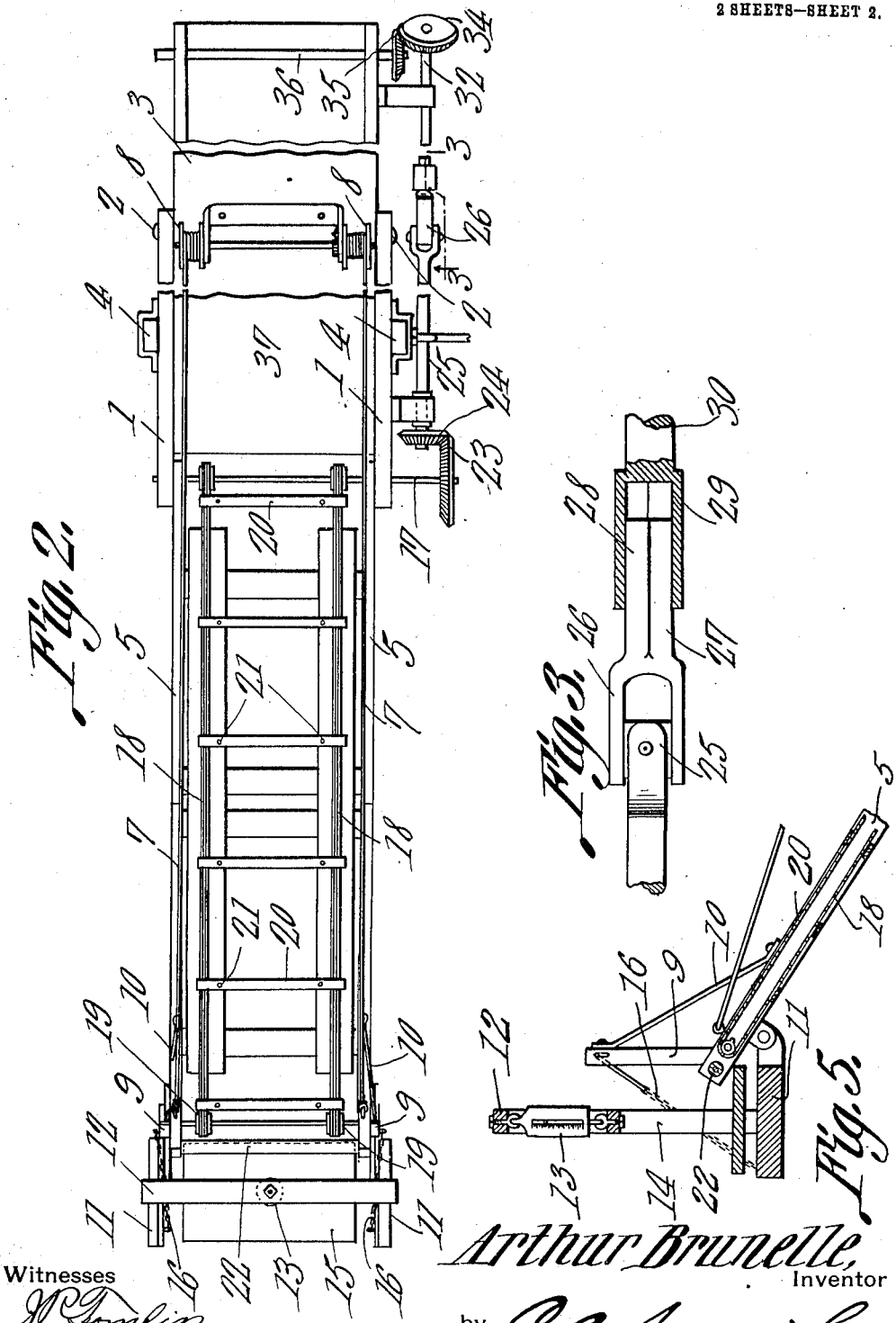

ARTHUR BRUNELLE, OF NORTH YAKIMA, WASHINGTON, ASSIGNOR OF ONE-HALF TO NOE CUILLERIER, ONE-FOURTH TO PAUL PATNODE, AND ONE-FOURTH TO HERMAN PATNODE, ALL OF NORTH YAKIMA, WASHINGTON.

BALE-HANDLING APPARATUS.

1,020,683.  Specification of Letters Patent.  Patented Mar. 19, 1912.

Application filed August 29, 1910. Serial No. 579,483.

*To all whom it may concern:*

Be it known that I, ARTHUR BRUNELLE, a citizen of the United States, residing at North Yakima, in the county of Yakima and State of Washington, have invented a new and useful Bale-Handling Apparatus, of which the following is a specification.

This invention has relation to bale handling apparatus adapted to be used in conjunction with baling presses and consists in the novel construction and arrangement of its parts as hereinafter shown and described.

The object of the invention is to provide an apparatus adapted to be attached to the frame of a baling press and operated from the movable parts of the said press for the purpose of receiving the bale from the delivering end of the press and elevating the same to a platform. A scale is provided at the platform whereat the bale is weighed and from the platform the bale may be deposited upon a pile of bales previously assembled and thus it will be seen that means are provided for elevating and piling the bales and determining the weight of each bale.

In the accompanying drawings:—Figure 1 is a side elevation of the bale handling apparatus with parts in section and parts broken away. Fig. 2 is a plan view of the same. Fig. 3 is a detail sectional view of a portion of a shaft forming a component part of the bale handling apparatus. Fig. 4 is a side elevation of shafts which are parts of the apparatus. Fig. 5 is a detailed sectional view of a portion of the apparatus.

The bale handling apparatus comprises a frame 1 which is pivotally connected at the point 2 to the delivery end of a baling chamber 3 of a baling press. Legs 4 support the outer portion of the frame 1 and are adjustably secured thereto. Flexible members 5' are connected at their lower ends to the outer portion of the frame 1 and at their upper ends to the upper portion of the baling chamber 3.

A conveyer frame 5 is pivotally connected at one end to the outer portion of the frame 1 and the said conveyer frame is preferably made in sections connected together by means of hinge joints 6 of usual pattern and as indicated in Fig. 1 of the drawings. Cables 7 are connected at their outer ends with the upper end of the conveyer frame 5 and the inner ends of the said cables are arranged to wind about drums 8 mounted upon the upper portion of the baling chamber 3 and in the vicinity of the delivery end thereof. Uprights 9 are located at the upper outer end of the conveyer frame 5. Braces 10 are connected at their upper ends to the upper portions of the said uprights and at their lower ends to the sides of the conveyer frame 5. Bars 11 are pivotally connected at their inner ends with the upper outer portion of the conveyer frame 5 and the said bars 11 at the opposite sides of the said conveyer frame are connected together by means of a vertically disposed yoke 12. A scale 13 is connected at its upper end with the intermediate portion of the yoke 12 and the lower end of the said scale 13 is connected with a yoke 14 which in turn supports a platform 15. The platform 15 is located below the upper delivery end of the conveyer frame 5. Chains or other similar flexible members 16 are connected at their lower ends with the outer end portions of the bars 11 and the said chains or similar elements are connected at their upper ends to the upper portions of the uprights 9. The said chains may be lengthened or shortened and thus the bars 11 may be fixed at a desired angle with relation to the conveyer frame 5 or conversely the said conveyer frame may be fixed at a desired angle with relation to the bars 11 which should remain horizontal when the apparatus is in operation. A shaft 17 is journaled for rotation at the outer end of the platform 1 and at the lower end of the conveyer frame and forms the pivotal connection between the said platform and conveyer frame. Endless chains 18 are arranged to move about the shaft 17 and wheels 19 journaled for rotation at the upper end of the conveyer frame 5 and the said chains are connected together by cross slats 20 which in turn are provided with upstanding pins 21. A roller 22 is journaled for free rotation at the upper outer end of the conveyer frame 5 beyond the delivery end of the elevator of which the chains 18 and cross slats 20 form component parts.

A beveled gear wheel 23 is fixed to the outer end of the shaft 17 and meshes with a beveled gear wheel 24 which is fixed to the end of a shaft 25. The shaft 25 is connected by means of a universal joint 26 with a stub shaft 27 which is provided with a non-circular end 28 snugly and slidably received in a socket 29 mounted upon a shaft 30. The universal joint 26 is located approximately opposite the pivot 2 between the platform 1 and the delivery end of the baling chamber 3 and the non-circular portion of the shaft 28 is located slightly to one side of the said point of pivotal connection between the parts 1 and 3. The shaft 30 is connected by means of a universal joint 31 with a shaft 32 which is journaled for rotation at the side of the baling chamber 3 and is provided at its rear end with a beveled pinion 34 which meshes with a bevel pinion 35 which is attached to a shaft 36 the said shaft 36 being one of the operating shafts of the baling press. The frame 1 is provided with a platform 37 which is located beyond the delivery end of the baling chamber 3.

During the formation of the bale in the baling chamber 3 the shaft 36 is in rotation and rotary movement is transmitted from the said shaft through the intermeshing gear wheels 35 and 34 to shaft 32. From the shaft 32 movement is transmitted through the universal joint 31 to the shaft 30. From the shaft 30 movement is transmitted through the sleeve 29 and stud shaft 27 and universal joint 26 to the shaft 25. From the shaft 25 rotary movement is transmitted through the intermeshing gear wheels 24 and 23 to the shaft 17. The shaft 17 actuates the chain 18 and the slats 20. As the bale within the chamber 3 arrives at completion it is pushed out at the delivery end of the chamber upon the platform 37 supported upon the frame 1. When the completed bale has been pushed out upon the said platform one end of the bale will be engaged by some of the pins 21 carried by one of the slats 20 and the bale will move up along with the chains 18 and the cross slats 20 until it arrives at the roller 22. It will pass out over the same and from the said roller will fall upon the scale platform 15 located below the delivery end of the conveyer frame 5. Thus the bale is removed from the baling press and elevated and when it is deposited upon the scale platform 15 the weight of the bale may be ascertained by consulting the scale 13. From the scale platform 13 the bale may be pushed off upon a pile of bales which have been previously assembled. As the pile of bales increases the angle of inclination of the conveyer frame 5 may be adjusted with relation to the surface of the ground in order that the subsequent bales may be placed upon the higher stack of bales.

By reason of the fact that the shaft 30 is connected by means of a universal joint 31 with the shaft 32 movement will be transmitted from the shaft 31 to the said shaft 30 notwithstanding the fact that the said shafts are out of alinement and even if said shafts should move with relation to each other as a result of the stress to which the baling press is subjected. Also by reason of the fact that the shaft 30 is connected with the shaft 27 by means of the sleeve 29 in which the said stud shaft may slip or slide longitudinally, movement will be transmitted from the shaft 30 to the said stud shaft 29 notwithstanding the fact that the said stud shaft 27 may move longitudinally with relation to the shaft 30 in consequence of the platform 1 being swung upon its pivotal connection with the baling chamber. Again by reason of the fact that the stud shaft 27 is operatively connected with the shaft 25 by means of the universal joint 26 the said stud shaft 27 may transmit rotary movement to the shaft 25 notwithstanding the fact that the said shaft and stud shaft are out of longitudinal alinement with each other and may have slight relative movement with respect to each other.

Having described the invention what I claim as new and desire to secure by Letters Patent is:—

In a bale handling apparatus, a conveyer frame, an endless carrier mounted for movement along the conveyer frame, arms pivoted to the delivery end of the frame, means for securing the said arms in an adjusted position, a yoke connecting the said arms together, a scale connected with the intermediate portion of the yoke, a yoke connected to the said scale, and a platform supported by the latter yoke located below the delivery end of the frame.

In testimony that I claim the foregoing as my own, I have hereto affixed my signature in the presence of two witnesses.

ARTHUR BRUNELLE.

Witnesses:
H. G. RAETTIG,
J. H. BRUFF.